United States Patent [19]
Huang

[11] Patent Number: 5,533,414
[45] Date of Patent: Jul. 9, 1996

[54] COUPLING DEVICE FOR COUPLING AN INDICATOR NEEDLE TO AN ACTUATING UNIT IN A PRESSURE GAUGE

[76] Inventor: Tien-Tsai Huang, No. 4-2, Lane 30, Wu-Chang St., Pan-Chiao City, Taipei Hsien, Taiwan

[21] Appl. No.: 446,306

[22] Filed: May 22, 1995

[51] Int. Cl.⁶ .................................................. G01L 19/00
[52] U.S. Cl. ............................ 73/866.1; 73/700; 73/741; 116/271
[58] Field of Search ................................. 73/866.1, 700, 73/756, 741, 4 R, 732; 116/271

[56] References Cited

U.S. PATENT DOCUMENTS

| | | | |
|---|---|---|---|
| 2,977,801 | 4/1961 | Dean | 73/866.1 |
| 3,530,720 | 9/1970 | Hurland et al. | 73/741 X |
| 3,590,641 | 7/1971 | Eggleston | 73/742 |
| 3,656,451 | 4/1972 | Raznov et al. | 116/286 |
| 3,686,944 | 8/1972 | Mollick | 73/708 X |
| 3,867,841 | 2/1975 | Widlund | 73/866.1 |
| 4,048,948 | 9/1977 | Sarasohn | 116/271 |
| 5,355,733 | 10/1994 | Murphy, Jr. et al. | 73/756 X |

FOREIGN PATENT DOCUMENTS

| | | | |
|---|---|---|---|
| 1201572 | 9/1965 | Germany | 73/866.1 |

Primary Examiner—Thomas P. Noland
Attorney, Agent, or Firm—Oblon, Spivak, McClelland, Maier & Neustadt

[57] ABSTRACT

A coupling device for a pressure gauge includes an upper positioning plate connected spacedly to a lower positioning plate, a sector gear disposed between the lower and upper positioning plates and mounted rotatably thereto, an adjustment plate mounted adjustably on a top side of the sector gear, a push rod with a first end adapted to be in force-transmitting relationship with an actuating unit of a pressure gauge and a second end connected to the adjustment plate, a pinion meshing with the sector gear and to be mounted with an indicator needle of the pressure gauge thereon, a support plate mounted on a bottom side of the lower positioning plate for supporting distal bottom ends of axles of the sector gear and the pinion thereon, and a spiral spring for biasing the pinion to rotate the indicator needle to a starting position. The bottom side of the lower positioning plate, which is made of plastic, is formed with a plurality of resilient, generally L-shaped hook projections which engage the periphery of the support plate, thus mounting the support plate on the lower positioning plate.

9 Claims, 4 Drawing Sheets

COUPLING DEVICE FOR COUPLING AN INDICATOR NEEDLE TO AN ACTUATING UNIT IN A PRESSURE GAUGE

BACKGROUND OF THE INVENTION

1. Field of the Invention

The invention relates to a pressure gauge, more particularly to a coupling device for coupling an indicator needle to an actuating unit in a pressure gauge.

2. Description of the Related Art

A pressure gauge includes an indicator needle, an actuating unit movable in response to pressure measured by the pressure gauge, and a coupling device connected operatively to the indicator needle and the actuating unit for moving the indicator needle in accordance with movement of the actuating unit.

Referring to FIG. 1, a conventional coupling device for a pressure gauge is shown to comprise a lower positioning plate 1a, an upper positioning plate 2a connected spacedly to the lower positioning plate 1a, a sector gear 3a disposed between the lower and upper positioning plates 1a, 2a and mounted rotatably thereto, an adjustment plate 4a disposed between the lower and upper positioning plates 1a, 2a and mounted adjustably on a top side of the sector gear 3a, a push rod 5a with a first end in force-transmitting relationship with the actuating unit of the pressure gauge (not shown) and a second end connected to the adjustment plate 4a, a pinion 6a disposed between the lower and upper positioning plates 1a, 2a and mounted rotatably thereto, the pinion 6a meshing with the sector gear 3a, and a support plate 15a mounted on a bottom side of the lower positioning plate 1a for supporting distal bottom ends of a gear axle of the sector gear 3a and a pinion axle of the pinion 6a thereon. The indicator needle (not shown) of the pressure gauge is mounted on a distal top end of the pinion axle above the upper positioning plate 2a. A spiral spring 7a biases the pinion 6a to rotate the indicator needle to a starting position.

The drawbacks of the conventional coupling device are as follows:

1. The conventional coupling device cannot be conveniently assembled because too many screws and rivets are employed. For example, screws are used to mount the support plate 15a on the bottom side of the lower positioning plate 1a, while rivets are used to connect the upper positioning plate 2a to the lower positioning plate 1a. This entails a relatively large manpower cost.

2. The conventional coupling device has small components, such as the pinion 6a, which are made of copper or copper alloy. Since metal forming is a relatively complicated process, the metal components of the conventional coupling device cannot be manufactured with ease. For example, in the case of the pinion 6a, high precision forming of its gear teeth is conducted through the use of a separate, relatively expensive process, thereby increasing the costs incurred in the manufacture of the conventional coupling device.

3. Since almost all of the components of the conventional coupling device are made of copper or copper alloy, the material cost of the conventional coupling device is relatively high.

SUMMARY OF THE INVENTION

Therefore, the object of the present invention is to provide a coupling device which is easier to manufacture and assemble than the aforementioned prior art.

Another object of the present invention is to provide a coupling device which includes some components that are made of plastic so as to result in lower material costs while maintaining high precision and durability.

Accordingly, the coupling device of the present invention is to be used in a pressure gauge with an indicator needle and an actuating unit movable in response to pressure measured by the pressure gauge, and is adapted to be connected operatively to the indicator needle and the actuating unit for moving the indicator needle in accordance with movement of the actuating unit. The coupling device comprises: a lower positioning plate; an upper positioning plate connected spacedly to the lower positioning plate; a sector gear disposed between the lower and upper positioning plates, the sector gear having a gear axle extending rotatably through the lower and upper positioning plates; an adjustment plate disposed between the lower and upper positioning plates and mounted adjustably on a top side of the sector gear; a push rod having a first end adapted to be in force-transmitting relationship with the actuating unit, and a second end connected to the adjustment plate; a pinion disposed between the lower and upper positioning plates, the pinion meshing with the sector gear and having a pinion axle extending rotatably through the lower and upper positioning plates, the indicator needle to be mounted on a distal top end of the pinion axle above the upper positioning plate; a support plate, which is made of metal, mounted on a bottom side of the lower positioning plate for supporting distal bottom ends of the gear axle and the pinion axle thereon; and a spiral spring having an innermost end connected to the pinion axle and an outermost end connected to one of the lower and upper positioning plates, the spiral spring biasing the pinion axle to rotate the indicator needle to a starting position when the indicator needle is mounted on the pinion axle.

The bottom side of the lower positioning plate, which is made of plastic, is formed with a plurality of resilient, generally L-shaped hook projections for engaging the periphery of the support plate to mount the support plate on the lower positioning plate.

One of the lower and upper positioning plates is formed integrally with at least one socket projection, while the other one of the lower and upper positioning plates is formed integrally with at least one pin projection that engages insertably the socket projection to connect spacedly the lower and upper positioning plates.

The bottom side of the lower positioning plate is further formed with a rounded stop projection for preventing sliding movement of the support plate relative to the hook projections.

Preferably, one of the lower and upper positioning plates is formed integrally with a positioning projection that extends toward the other one of the lower and upper positioning plates. The positioning projection is formed with a retaining groove for engaging the outermost end of the spiral spring.

In addition, the pinion axle, which is made of metal, may be formed separately from the pinion, which is made of plastic.

The adjustment plate has a pivot hole and an adjustment slot formed therethrough. A pair of screws extend respectively through the pivot hole and the adjustment slot and engage threadedly the sector gear to mount the adjustment plate on the sector gear. Preferably, the sector gear is formed with a pair of downwardly extending screw sockets, and the screws engage threadedly and respectively the screw sockets.

In addition, the adjustment plate is formed with an upwardly extending screw socket, and a screw engages threadedly the screw socket on the adjustment plate and connects the second end of the push rod to the adjustment plate.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
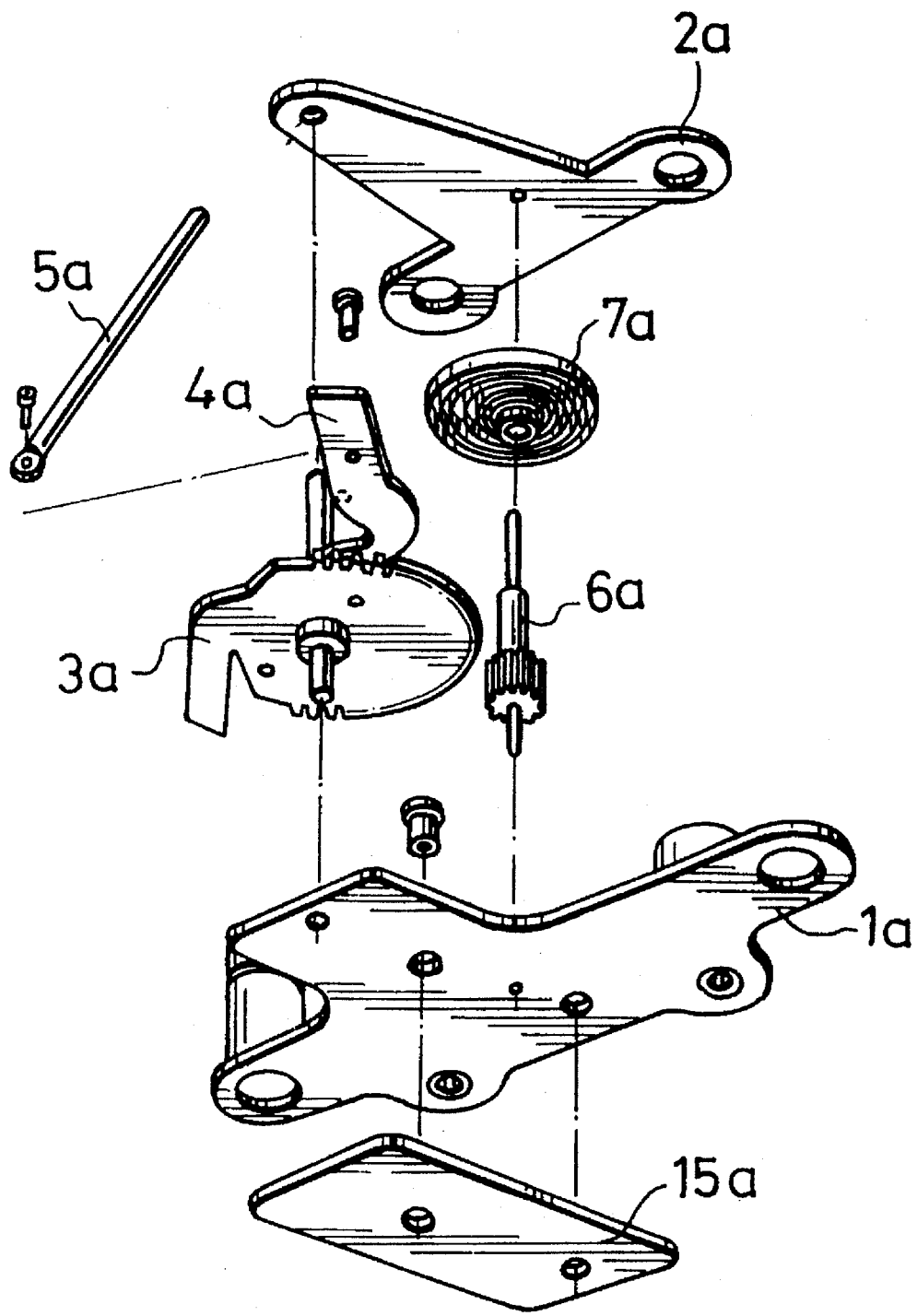
FIG. 1 is an exploded view of a conventional coupling device for coupling an indicator needle to an actuating unit in a pressure gauge.
Figure 2:
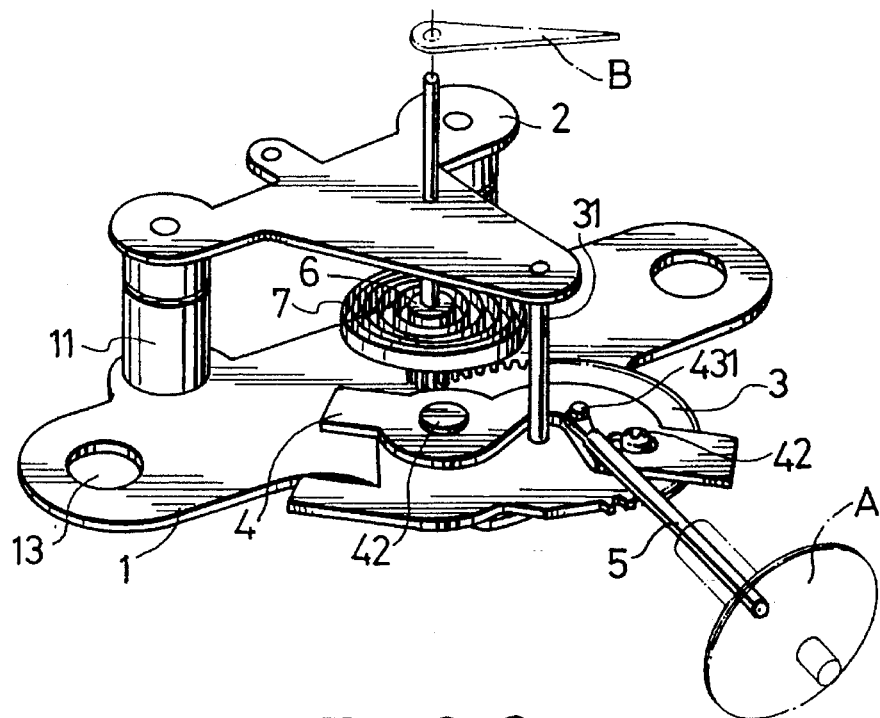
FIG. 2 is a perspective view of the preferred embodiment of a coupling device according to the present invention.

Referring to FIG. 2, the preferred embodiment of a coupling device according to the present invention is shown to comprise lower and upper positioning plates 1, 2, a sector gear 3, an adjustment plate 4, a push rod 5, a pinion 6 and a spiral spring 7.

Figure 3:
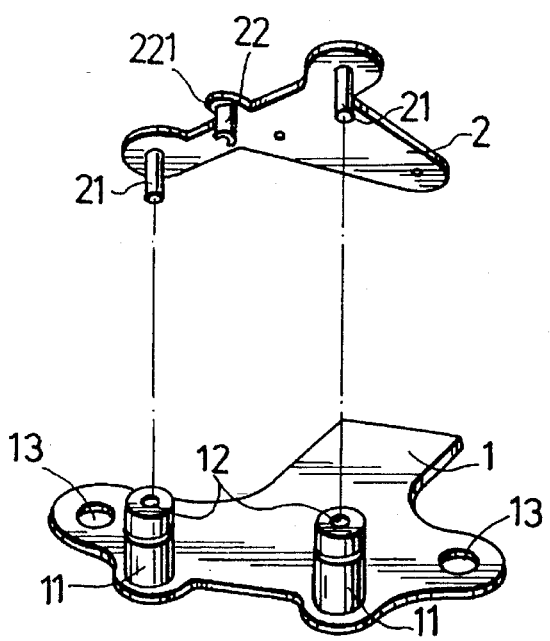
FIG. 3 illustrates how lower and upper positioning plates of the preferred embodiment are connected.

Referring to FIG. 3, the lower positioning plate 1 is formed integrally with a pair of upwardly extending socket projections 11 and a pair of through-holes 13 for mounting the lower positioning plate 11 to a pressure gauge housing (not shown). Each of the socket projections 11 confines an axial bore 12 therethrough. The upper positioning plate 2 is formed integrally with a pair of downwardly extending pin projections 21 that engage insertably the socket projections 11 to connect spacedly the lower and upper positioning plates 1, 2. The lower and upper positioning plates 1, 2 are made of plastic.

Figure 4:
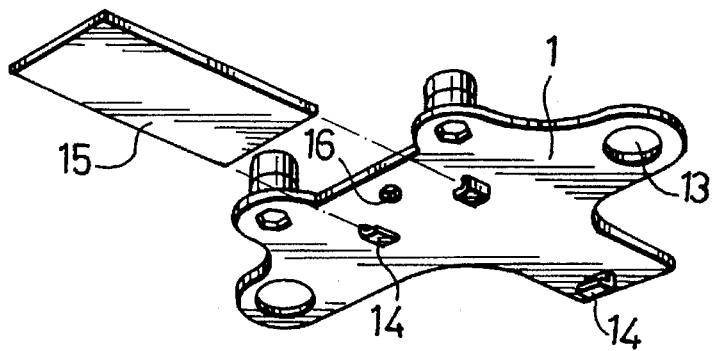
FIG. 4 illustrates how a support plate is mounted on the lower positioning plate of the preferred embodiment.

Referring to FIG. 4, the bottom side of the lower positioning plate 1 is formed with three resilient, generally L-shaped hook projections 14. The coupling device further comprises a metal support plate 15 which is mounted on the bottom side of the lower positioning plate 1 by means of the hook projections 14. In this embodiment, the support plate 15 is rectangular in shape, and the hook projections 14 engage three peripheral sides of the support plate 15 to mount the support plate 15 on the lower positioning plate 1. The bottom side of the lower positioning plate 1 is further formed with a rounded stop projection 16 for preventing sliding movement of the support plate 15 relative to the hook projections 14.

Figure 5:
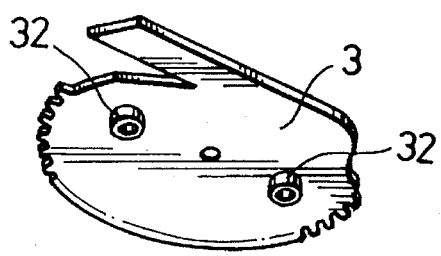
FIG. 5 is a rear perspective view of a sector gear of the preferred embodiment.

Referring to FIGS. 2 and 5, the sector gear 3 is disposed between the lower and upper positioning plates 1, 2 and has a gear axle 31 which extends rotatably through the lower and upper positioning plates 1, 2. The sector gear 3 is made of plastic and is sleeved securely on the gear axle 31, which is made of metal. The sector gear 3 has a bottom side which is formed with a pair of downwardly extending screw sockets 32.

Figure 6:
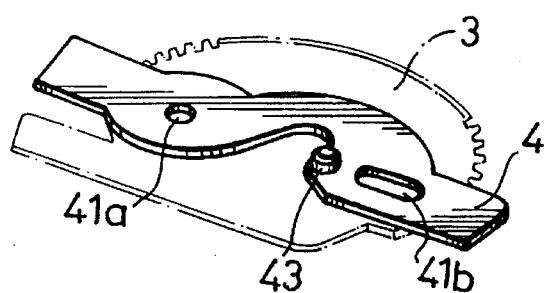
FIG. 6 illustrates how an adjustment plate is mounted on the sector gear of the preferred embodiment.

Referring to FIGS. 2 and 6, the adjustment plate 4 is disposed between the lower and upper positioning plates 1, 2 and is mounted adjustably on a top side of the sector gear 3. The adjustment plate 4 has a pivot hole 41a and an adjustment slot 41b formed therethrough. A pair of screws 42 extend respectively through the pivot hole 41a and the adjustment slot 41b and engage threadedly and respectively the screw sockets 32 of the sector gear 3 to mount the adjustment plate 4 on the sector gear 3. Of course, the lengths of the screw sockets 32 may be made longer to strengthen mounting of the adjustment plate 4 on the sector gear 3. The adjustment plate 4 is further formed with an upwardly extending screw socket 43.

Referring again to FIG. 2, the push rod 5 has a first end adapted to be in force-transmitting relationship with an actuating unit (A) of a pressure gauge, and a second end connected to the adjustment plate 4. In this embodiment, a screw 431 engages threadedly the screw socket 43 on the adjustment plate 4 and connects the second end of the push rod 5 to the adjustment plate 4.

Figure 7:
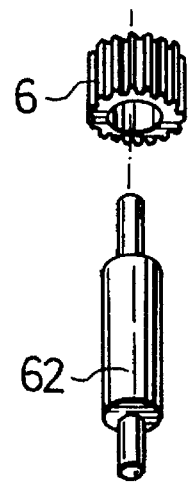
FIG. 7 illustrates a pinion of the preferred embodiment.

Referring to FIGS. 2 and 7, the pinion 6 is disposed between the lower and upper positioning plates 1, 2 and meshes with the sector gear 3. The pinion 6, which is preferably made of plastic, is sleeved securely on a pinion axle 62, which is preferably made of metal and which extends rotatably through the lower and upper positioning plates 1, 2. The indicator needle (B) of the pressure gauge is mounted on a distal top end of the pinion axle 62 above the upper positioning plate 2.

Figure 8:
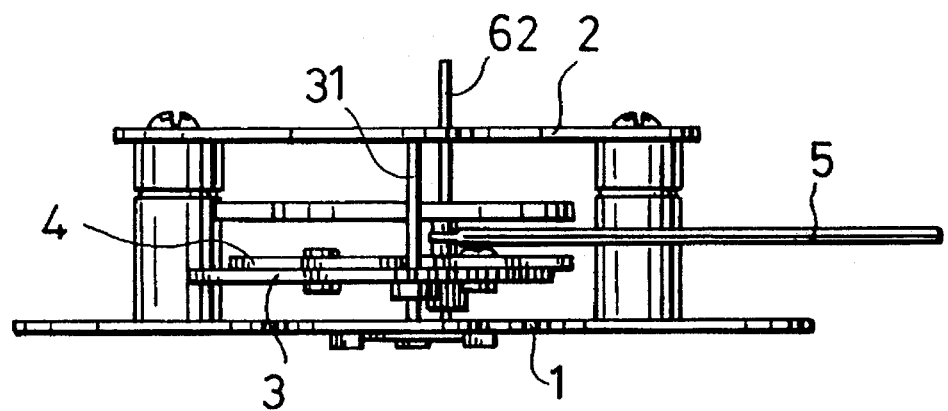
FIG. 8 is a schematic view of the preferred embodiment.

Referring to FIG. 8, the support plate 15 serves to support distal bottom ends of the gear axle 31 and the pinion axle 62 thereon.

Referring once more to FIG. 3, the upper positioning plate 2 is formed integrally with a positioning projection 22 that extends toward the lower positioning plate 1. The positioning projection 22 is formed with a retaining groove 221. As shown in FIG. 2, the spiral spring 7 has an innermost end connected to the pinion axle 62 and an outermost end engaged within the retaining groove 221.

When the actuating unit (B), such as an aneroid bellows, moves in response to pressure entering the pressure gauge housing (not shown), corresponding movement of the push rod 5 occurs so as to cause the sector gear 3, which is connected to the push rod 5 via the adjustment plate 4, to rotate and drive the pinion 6, thereby moving the indicator needle (B) in accordance with movement of the actuating unit (A). The spiral spring 7 biases the pinion axle 62 to rotate the indicator needle (B) to a starting position when the pressure gauge is not in use.

It is noted that the coupling device of this invention is easier to assemble than the aforementioned prior art because the number of screws employed is dramatically reduced. In addition, since most of the components of the coupling device are made of injection-molded plastic, the costs incurred in the manufacture of the coupling device are reduced. Metal is still used as the material for the remaining components of the coupling device to maintain its durability.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A coupling device for a pressure gauge with an indicator needle and an actuating unit movable in response to pressure measured by the pressure gauge, said coupling device being adapted to be connected operatively to the indicator needle and the actuating unit and moving the indicator needle in accordance with movement of the actuating unit, said coupling device comprising:

a lower positioning plate;

an upper positioning plate connected spacedly to said lower positioning plate;

a sector gear disposed between said lower and upper positioning plates, said sector gear having a gear axle extending rotatably through said lower and upper positioning plates;

an adjustment plate disposed between said lower and upper positioning plates and mounted adjustably on a top side of said sector gear;

a push rod having a first end adapted to be in force-transmitting relationship with the actuating unit, and a second end connected to said adjustment plate;

a pinion disposed between said lower and upper positioning plates, said pinion meshing with said sector gear and having a pinion axle extending rotatably through said lower and upper positioning plates, the indicator needle to be mounted on a distal top end of said pinion axle above said upper positioning plate;

a support plate mounted on a bottom side of said lower positioning plate for supporting distal bottom ends of said gear axle and said pinion axle thereon; and a spiral spring having an innermost end connected to said pinion axle and an outermost end connected to one of said lower and upper positioning plates, said spiral spring biasing said pinion axle to rotate the indicator needle to a starting position when the indicator needle is mounted on said pinion axle;

wherein said lower positioning plate is made of plastic, said bottom side of said lower positioning plate being formed with a plurality of resilient generally L-shaped hook projections for engaging the periphery of said support plate to mount said support plate on said lower positioning plate.

2. The coupling device as claimed in claim 1, wherein one of said lower and upper positioning plates is formed integrally with at least one socket projection, and the other one of said lower and upper positioning plates is formed integrally with at least one pin projection that engages insertably said socket projection to connect spacedly said lower and upper positioning plates.

3. The coupling device as claimed in claim 1, wherein said support plate is made of metal.

4. The coupling device as claimed in claim 1, wherein said bottom side of said lower positioning plate is further formed with a rounded stop projection for preventing sliding movement of said support plate relative to said hook projections.

5. The coupling device as claimed in claim 1, wherein one of said lower and upper positioning plates is formed integrally with a positioning projection that extends toward the other one of said lower and upper positioning plates, said positioning projection being formed with a retaining groove for engaging said outermost end of said spiral spring.

6. The coupling device as claimed in claim 1, wherein said pinion is made of plastic and said pinion axle is made of metal.

7. The coupling device as claimed in claim 1, wherein said adjustment plate has a pivot hole and an adjustment slot formed therethrough, said coupling device further comprising a pair of screws which extend respectively through said pivot hole and said adjustment slot and which engage threadedly said sector gear to mount said adjustment plate on said sector gear.

8. The coupling device as claimed in claim 7, wherein said sector gear is formed with a pair of downwardly extending screw sockets, said screws engaging threadedly and respectively said screw sockets.

9. The coupling device as claimed in claim 1, wherein said adjustment plate is formed with an upwardly extending screw socket, said coupling device further comprising a screw which engages threadedly said screw socket and which connects said second end of said push rod to said adjustment plate.

* * * * *